United States Patent [19]

Obayashi et al.

[11] Patent Number: 4,691,286

[45] Date of Patent: Sep. 1, 1987

[54] METHOD AND APPARATUS FOR DETECTING COMBUSTION VARIATIONS IN INTERNAL COMBUSTION ENGINE

[75] Inventors: Hideki Obayashi, Okazaki; Hisasi Kawai, Toyohashi; Toshikazu Ina, Nagoya; Takashi Shigematsu, Susono; Setsuo Tokoro, Susono; Tokio Kohama, Nishio, all of Japan

[73] Assignees: Nippon Soken, Inc., Nishio; Nippondenso Co., Ltd., Kariya; Toyota Jidosha Kabushiki Kaisha, Toyota, all of Japan

[21] Appl. No.: 749,087

[22] Filed: Jun. 26, 1985

[30] Foreign Application Priority Data

Jun. 27, 1984 [JP] Japan .................................. 59-133504

[51] Int. Cl.$^4$ .......................... F02B 3/02; G06F 15/20
[52] U.S. Cl. .......................... 364/431.04; 364/431.05; 364/431.08; 123/419; 123/436
[58] Field of Search .................. 364/431.04, 431.05, 364/431.08, 506; 123/419, 436; 73/116, 117.3

[56] References Cited

U.S. PATENT DOCUMENTS

| | | | |
|---|---|---|---|
| 4,044,234 | 8/1977 | Frobenius et al. | 364/431.08 |
| 4,357,662 | 11/1982 | Schur et al. | 123/436 |
| 4,509,477 | 4/1985 | Takao et al. | 123/436 |
| 4,532,592 | 7/1985 | Citron et al. | 364/431.05 |
| 4,562,818 | 1/1986 | Kohama et al. | 364/431.08 |

FOREIGN PATENT DOCUMENTS

| | | | |
|---|---|---|---|
| 0176424 | 10/1983 | Japan | 123/436 |
| 0052726 | 3/1984 | Japan | 73/116 |

Primary Examiner—Parshotam S. Lall
Attorney, Agent, or Firm—Cushman, Darby & Cushman

[57] ABSTRACT

In an internal combustion engine, a plurality of engine rotational speeds are detected at predetermined timings for every firing stroke in one cylinder of the engine, and an engine speed variation is calculated as a variation between the square of one of the engine rotational speed and the square of another of the engine rotational speed. A process is performed upon the sequence of the engine speed variations, thus determining an engine combustion state by the processed result.

8 Claims, 28 Drawing Figures

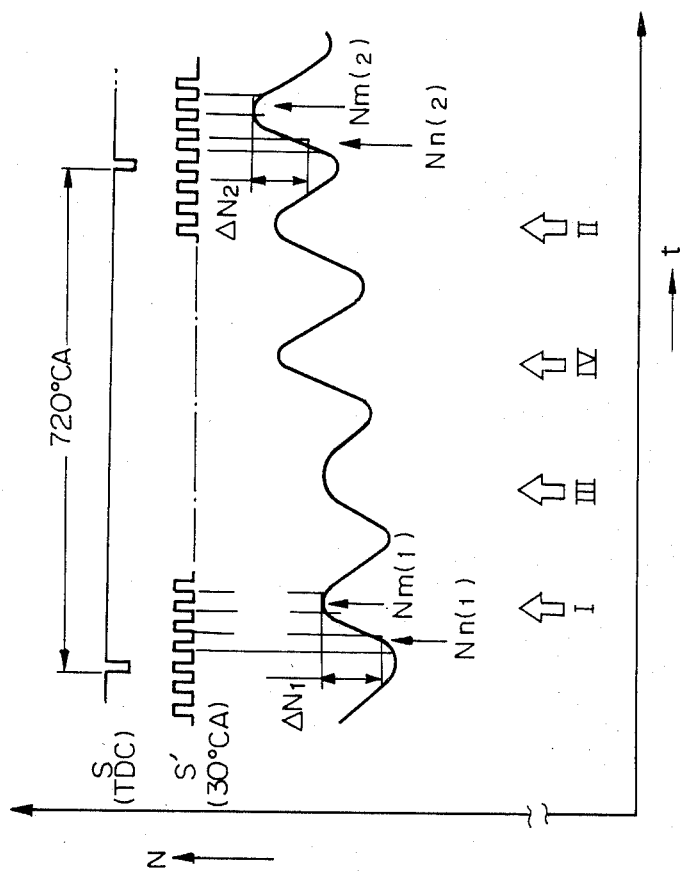

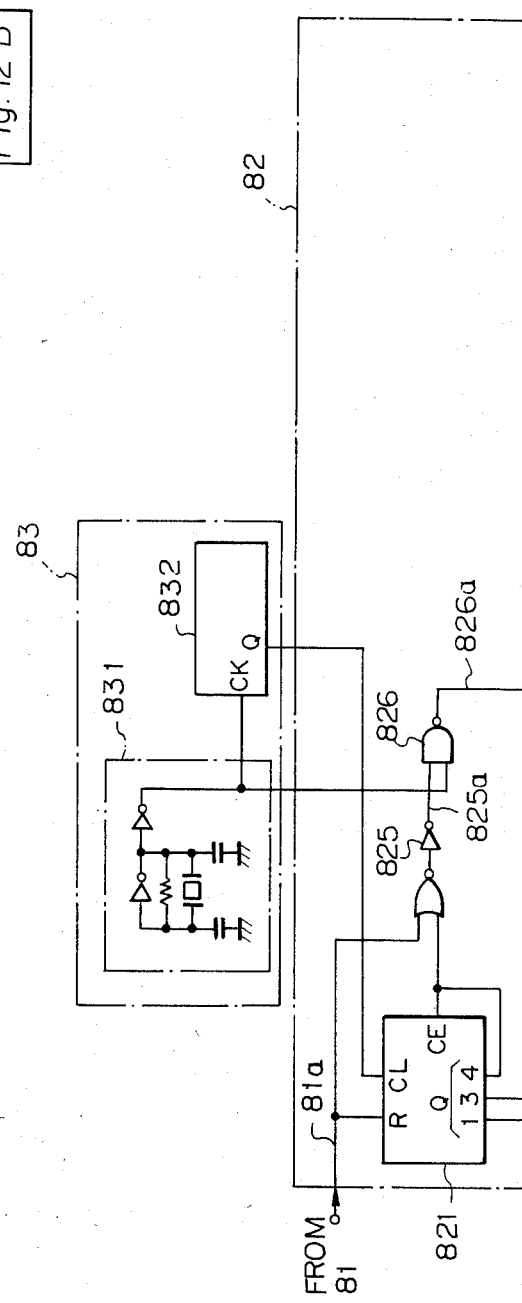

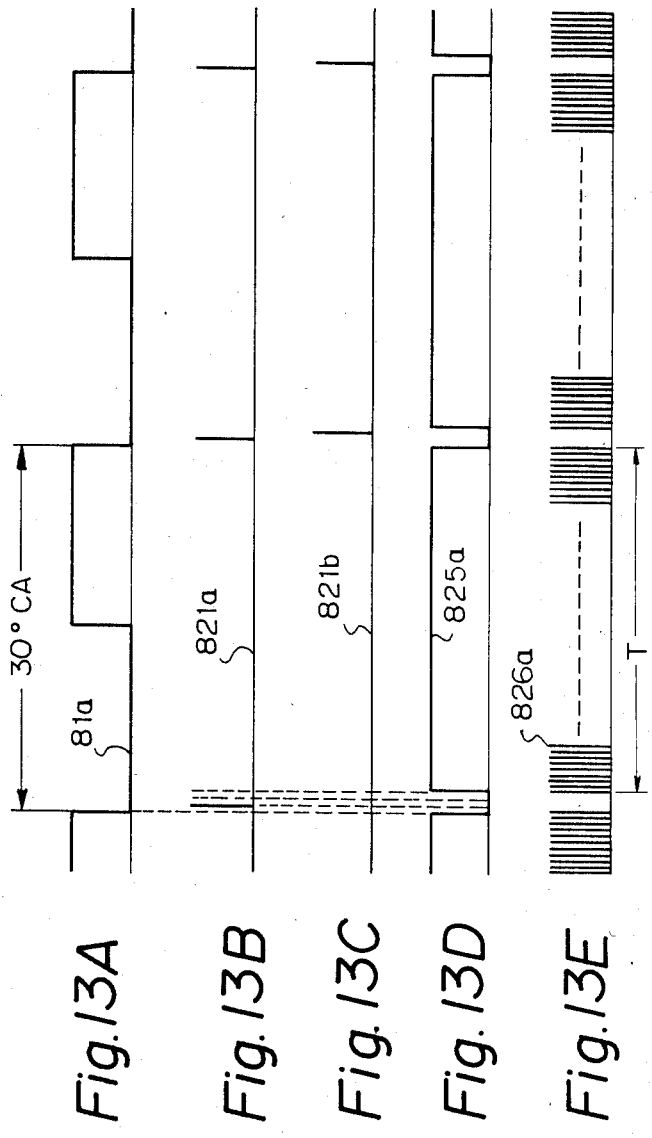

METHOD AND APPARATUS FOR DETECTING COMBUSTION VARIATIONS IN INTERNAL COMBUSTION ENGINE

BACKGROUND OF THE INVENTION (1) Field of the Invention

The present invention relates to a method and apparatus for detecting combustion variations in an internal combustion engine.

(2) Description of the Related Art

As measures taken against exhaust gas pollution and fuel consumption, various systems for controlling the air-fuel ratio and ignition timing of the engine have been developed. In one of such systems, the air-fuel ratio (or the ignition timing) is controlled by detecting combustion (output) variations.

According to the prior art combustion variation detecting method, a time period $T_i$ required for one revolution of the engine is measured, and a mean engine rotational speed for one revolution of the engine is calculated on the basis of the time period $T_i$. Thus, an engine combustion variation can be detected by monitoring the sequence of the mean engine rotational speed for every one revolution.

In the prior art method, however, the mean engine rotational speed obtained for one revolution of the engine is affected greatly by the load variation of the engine due to the state of the road on which a vehicle is driven, the transient state of the engine, and the like. Therefore, it is difficult to accurately detect combustion variations.

SUMMARY OF THE INVENTION

It is an object of the present invention to provide a method and apparatus for detecting combustion variations in an internal combustion engine which can detect accurate combustion variations, even when the state of the road is rough and the engine is in transient state.

According to the present invention, in an internal combustion engine, a plurality of engine rotational speeds are detected at predetermined timings for every firing stroke in one cylinder of the engine, and an engine speed variation is calculated as a variation between the square of one of the engine rotational speed and the square of another of the engine rotational speed. A process is performed upon the sequence of the engine speed variations, thus determining an engine combustion state by the processed result. That is, the present invention is based upon the phenomenon that an engine speed is changed periodically and pulsatively in accordance with every firing stroke of the cylinders. Such a periodic and pulse-like engine speed variation is not affected by the rough state of the road and the engine transient state.

BRIEF DESCRIPTION OF THE DRAWINGS

The present invention will be more clearly understood from the description as set forth below with reference to the accompanying drawings, wherein:

FIGS. 1A, 1B, 1C, and 2 are timing diagrams of the engine rotational speed;

FIGS. 12A and 12B constitute a circuit diagram of the counter circuit of FIG. 11;

FIGS. 13A through 13E are timing diagrams showing the operation of the circuit of FIG. 12;

DESCRIPTION OF THE PREFERRED EMBODIMENTS

Figure 1A:
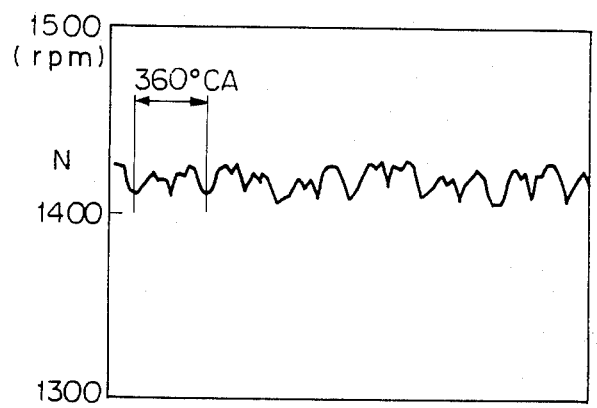
Figure 1B:
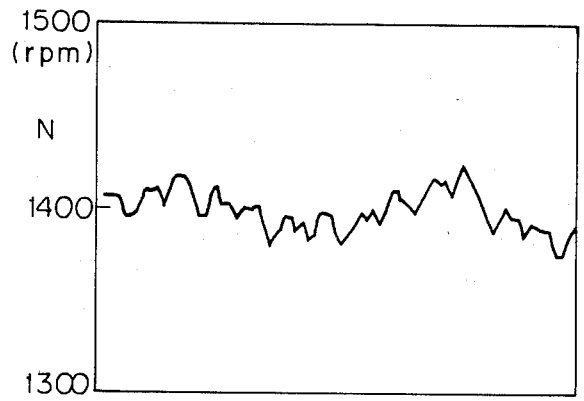
Figure 1C:
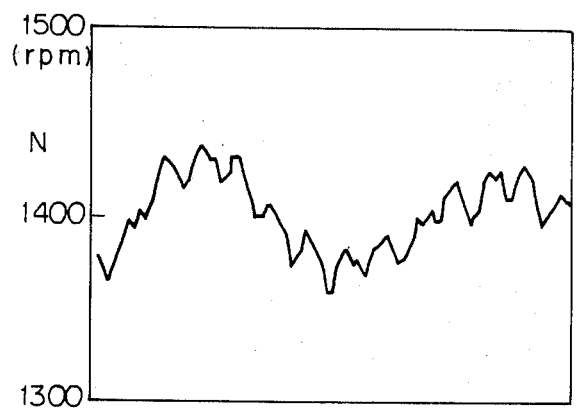

First, the change of the engine rotational speed N will be explained with reference to FIG. 1A, 1B, and 1C. Here, it is assumed that the vehicle speed is at a definite value and the air-fuel ratio A/F is around the stoichiometric ratio (A/F=14.5). In addition, the engine rotational speed N is detected for every 30° crank angle (CA). FIG. 1A shows the case wherein the vehicle is test-driven in a workshop; FIG. 1B shows the case wherein the vehicle is driven on a paved road; and FIG. 1C shows the case wherein the vehicle is driven on a rough road. Thus, if the engine speed variation is calculated for every 360° CA, i.e., every one revolution of the engine, the calculated engine speed variation is affected by the load due to the roughness of the road in addition to the engine combustion variation itself. In addition, the calculated engine speed variation obtained for every 360° CA is affected by a transient state such as an accelerating state or a decelerating state of the engine. Therefore, it is difficult to accurately calculate combustion variations by using the mean engine rotational speed obtained for every 360° CA.

The principle of the present invention will be explained with reference to FIGS. 2 through 7, 8A, 8B, 9A, and 9B.

In FIG. 2, references I, II, III, and IV represent the firing strokes of the first, second, third, and fourth cylinders, respectively, in the case of a 4-stroke-cycle 4-cylinder engine. That is, the first, third, fourth, and second cylinders fire in this order. Reference S designates a top dead center (TDC) signal which is kept at "0" during an interval in which the crankshaft is rotated by 30° CA after the first cylinder reaches top dead center, and S' designates an angle signal generated for every 30° CA. References $N_n(1)$, $N_m(1)$, $N_n(2)$, about $N_m(2)$ are mean engine rotational speeds for 30° CA at predetermined crank angles of a predetermined cylinder which is, in this case, the first cylinder. The mean engine rotational speeds $N_n(1)$ and $N_m(1)$ are for the first firing stroke of the first cylinder, while the mean engine rotational speeds $N_n(2)$ and $N_m(2)$ are for the second firing stroke of the first cylinder. The mean engine rotational speeds $N_n(1)$ and $N_n(2)$ are for 30° CA to 60° CA for the firing stroke of the first cylinder, while the mean engine rotational speeds $N_m(1)$ and $N_m(2)$ are for 90° CA to 120° CA for the firing stroke of the first cylinder.

As understood from FIG. 2, the microscopic engine rotational speed N is composed of waveforms of a relatively small period determined by the firing stroke of each cylinder, and waveforms of a relatively large period determined by the load and the transient state of the engine.

An aspect of the present invention is that a combustion variation is an engine speed variation ΔN represented by $$\Delta N = N_m^2 - N_n^2.$$

Figure 3:
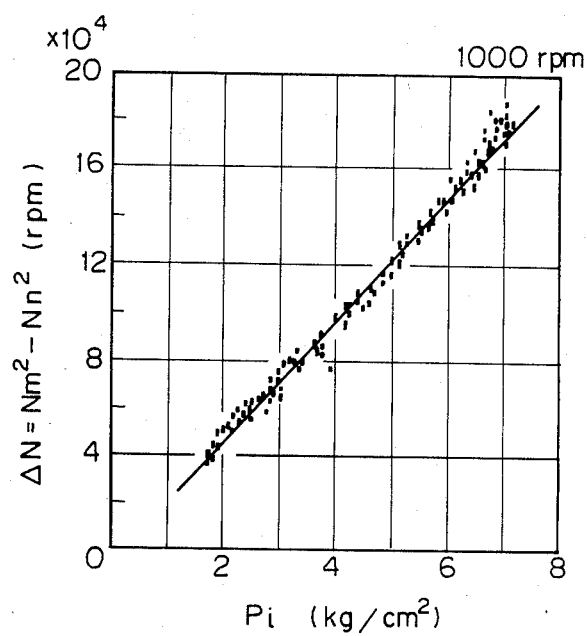
FIGS. 3, 4, and 5 are graphs showing the relationship between the engine speed variation and the pressure within a cylinder of the engine according to the present invention.
Figure 4:
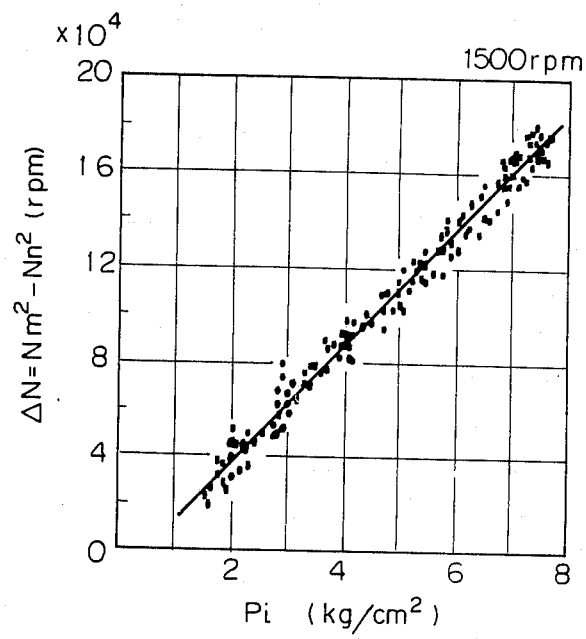
Figure 5:
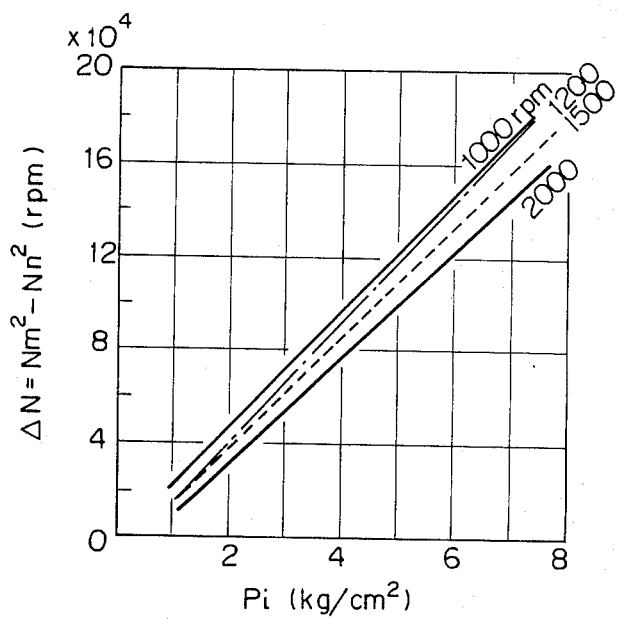

As shown in FIGS. 3, 4, and 5, this type of engine speed variation ΔN has a strong relation to the mean pressure $P_i$ within a predetermined cylinder which is, in this case, the first cylinder. FIG. 3 shows the case wherein the engine speed N is 1000 rpm; FIG. 4 shows the case wherein the engine speed N is 1500 rpm; and FIG. 5 shows the case wherein the engine speed N is 1000, 1200, 1500, and 2000 rpm. That is, the engine speed variation ΔN has a definite slope with respect to the mean pressure within a cylinder irrespective of the engine rotational speed N, and accordingly, the mean pressure $P_i$ within a cylinder can be always assumed by the engine speed variation ΔN.

Figure 6:
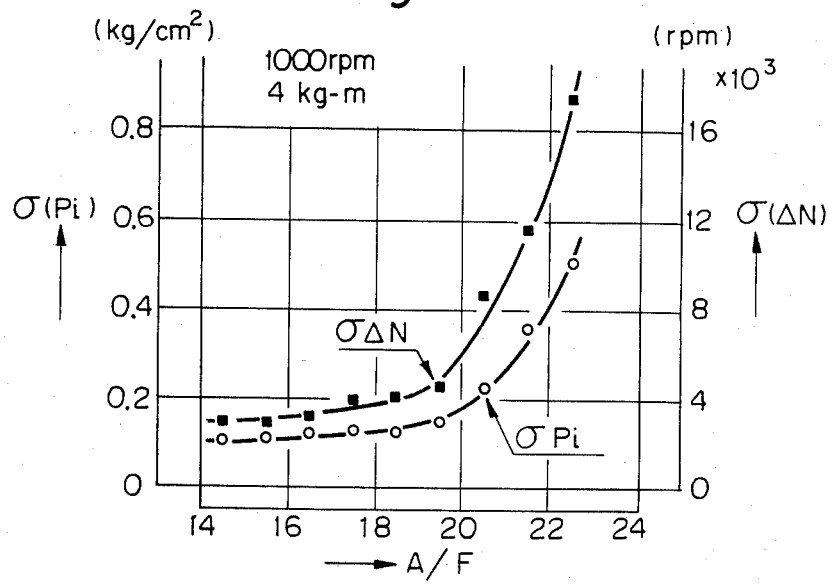
FIG. 6 is a graph showing the relationship between the air-fuel ratio and the engine speed variation according to the present invention.

FIG. 6 is a graph showing the relationship between the air-fuel ratio A/F and the standard deviation $\sigma(P_i)$ of the pressure $P_i$ within a cylinder, and also showing the relationship between the air-fuel ratio A/F and the standard deviation $\sigma(\Delta N)$ of the engine speed variations ΔN.

Figure 7:
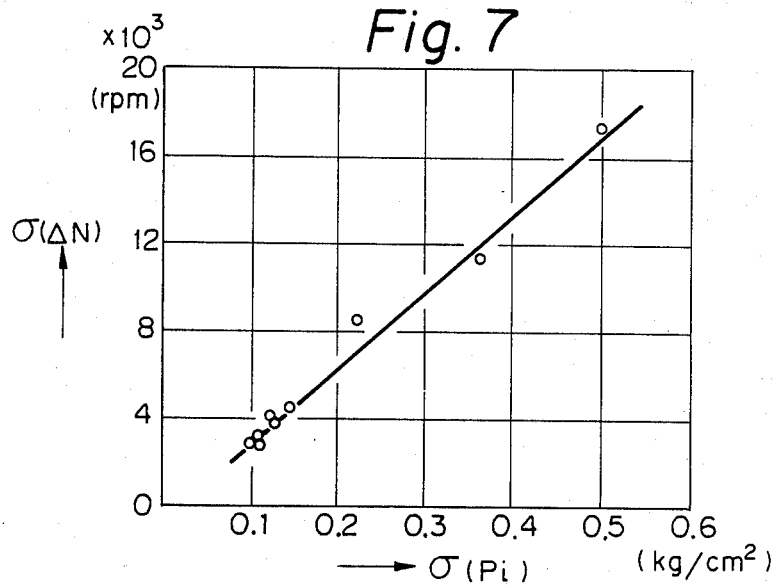
FIG. 7 is a graph showing the relationship between the pressure within a cylinder of the engine and the engine speed variation according to the present invention.

FIG. 7 is a graph showing the relationship between the standard deviation $\sigma(P_i)$ of the pressure $P_i$ within a cylinder and the standard deviation $\sigma(\Delta N)$ of the engine speed variations ΔN. In FIGS. 6 and 7, it is assumed that the engine rotational speed N is 1000 rpm and the engine output torque is 4 kg.m.

As understood from FIGS. 6 and 7, the air-fuel ratio A/F can be controlled by using the standard deviation $\sigma(\Delta N)$ as well as the standard deviation $\sigma(P_i)$. For example, a standard deviation $\sigma(\Delta N)$ of engine speed variations ΔN is calculated, and the calculated deviation is compared with a reference value corresponding to a desired air-fuel ratio. As a result of this comparison, when the calculated standard deviation $\sigma(\Delta N)$ is larger than the reference value, the fuel injection amount is increased to decrease the controlled air-fuel ratio, and when the calculated standard deviation $\sigma(\Delta N)$ is not larger than the reference value, the fuel injection amount is decreased to increase the controlled air-fuel ratio. Thus, the engine can be operated at a desired air-fuel ratio by feedback control of the standard deviation $\sigma(\Delta N)$.

Another aspect of the present invention is that a combustion variation is a variation $\Delta(\Delta N)$ between the engine speed variation ΔN represented by $$\Delta(\Delta N) = \Delta N_2 - \Delta N_1$$
$$= (N_m(2)^2 - N_n(2)^2) - (N_m(1)^2 - N_n(1)^2).$$

Figure 8A:
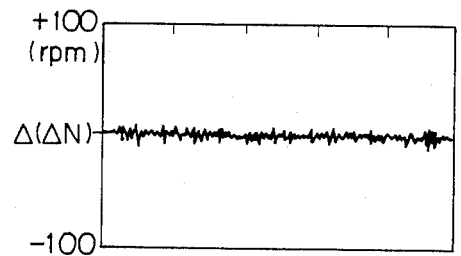
FIGS. 8A and 8B are timing diagrams of the engine speed variation of the prior art.
Figure 8B:
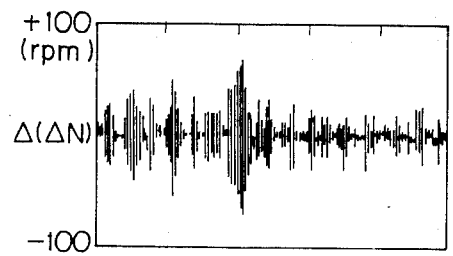
Figure 9A:
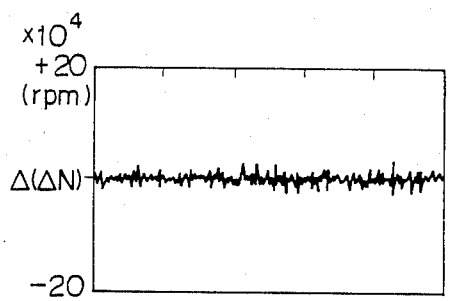
FIGS. 9A and 9B are timing diagrams of the engine speed variation according to the present invention.
Figure 9B:
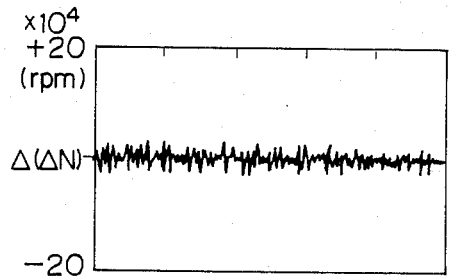

If a variation $\Delta(\Delta N)$ is calculated on the basis of a time period for one revolution (360° CA) as in the prior art, the variation $\Delta(\Delta N)$ in the case wherein the vehicle is test-driven in a workshop is shown in FIG. 8A, and the variation $\Delta(\Delta N)$ in the case wherein the vehicle is driven on a rough road is shown in FIG. 8B. That is, in this case, the variation $\Delta(\Delta N)$ is affected by the load variation of the engine or transient state of the engine. Contrary to this, according to the present invention, the variation $\Delta(\Delta N)$ in the case wherein the vehicle is test-driven in a workshop is shown in FIG. 9A, and the variation $\Delta(\Delta N)$ in the case wherein the vehicle is driven on a rough road is shown in FIG. 9B. That is in this case, the variation $\Delta(\Delta N)$ is not affected by the load variation of the engine or the transient state of the engine. That is, according to the present invention, an engine rotational speed N is detected on the basis of a very small period such as 30° CA, and accordingly, the variation of the engine rotational speed N within such a very small period by the load variation of the engine and the transient state of the engine is negligible.

Thus, combustion variations can be detected by using the variations $\Delta(\Delta N)$ on the basis of a small period such as 30° CA, instead of the variations ΔN on the same basis.

Figure 10:
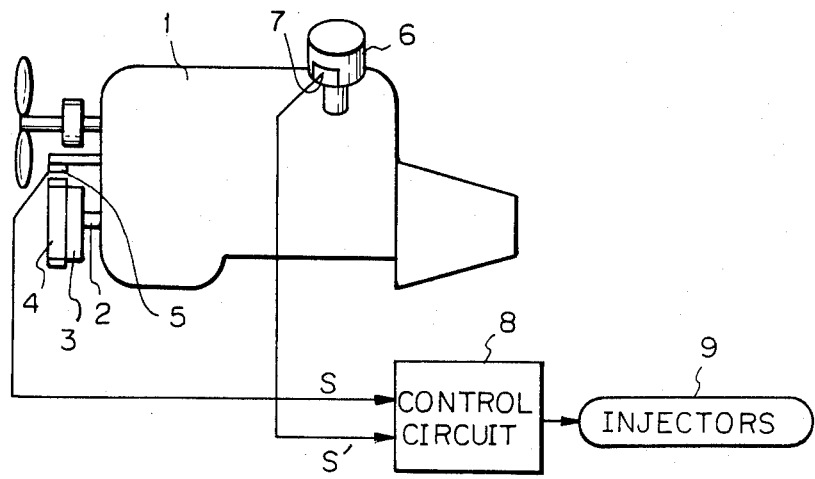
FIG. 10 is a schematic diagram of an internal combustion engine according to the present invention.

In FIG. 10, which is a schematic illustration of an internal combustion engine according to the present invention, reference numeral 1 designates a 4-stroke-cycle 4 cylinder engine mounted in an automobile.

Mounted on a pulley 3 located at the distal end of a crankshaft 2 is an angle signal plate 4, which is a magnetic disk having 12 teeth on its outer periphery. In addition, mounted in a position opposed to the teeth of the angle signal plate 4 is an angle signal sensor 5. The sensor 5 generates one pulse every time one tooth of the signal plate 4 passes the sensor 5. Therefore, the sensor 5 generates a signal of 12 pulses for each revolution of the crankshaft, i.e., a 30° CA signal S. Note that the crankshaft rotates twice during the period in which the first to fourth cylinders complete the firing stroke sequence.

Reference numeral 6 designates a distributor which incorporates a cylinder determination sensor 7. The cylinder determination sensor 7 generates a pulse signal S' at a time corresponding to the top dead center position of the first cylinder, i.e., a 720° CA signal (hereinafter referred to as a TDC signal S').

A control circuit 8 responds to the 30° CA signal S of the angle signal sensor 5, the TDC signal S' of the cylinder determination sensor 7, and the like to calculate a fuel injection amount, thereby controlling the injectors 9. The control circuit 8 may be comprised of a microcomputer.

Figure 11:
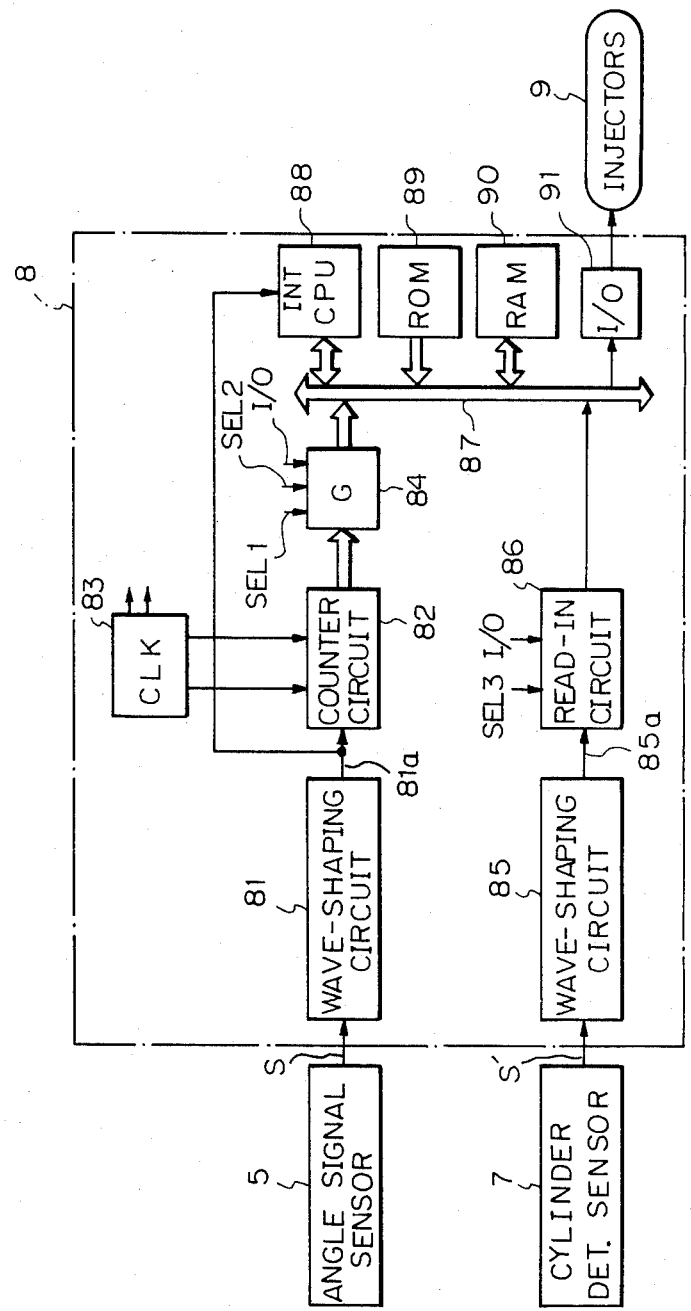
FIG. 11 is a detailed block diagram of the control circuit of FIG. 10.

The control circuit 8 will be explained in detail with reference to FIG. 11. The 30° CA signal S from the angle signal sensor 5 is shaped by a wave-shaping circuit 81, and its output 81a is supplied to a counter circuit 82 and to an interrupt terminal INT of the CPU 88. The counter circuit 88 comprises a 16-bit binary counter which counts clock signals of a clock generator 83 for the period of 30° CA of the 30° CA signal S, thereby obtaining a digital value inversely proportional to the engine rotational speed N. The digital value of the counter circuit 82 is supplied via the gate circuit 84 to the CPU 88 which, in turn, calculates the engine rotational speed N (see: steps 1607 and 1608 of FIG. 16). When the 30° CA signal S from the wave-shaping circuit 81 is supplied to the interrupt terminal INT, the CPU 88 carries out an interrupt routine for detecting combustion variations, which will be later explained with reference to FIG. 16.

The TDC signal S' from the cylinder determination sensor 7 is shaped by a wave-shaping circuit 85 and its output 85a is supplied to a read-in circuit 86, which is connected to a bus 87 comprised of 12 bits.

Figure 16A:
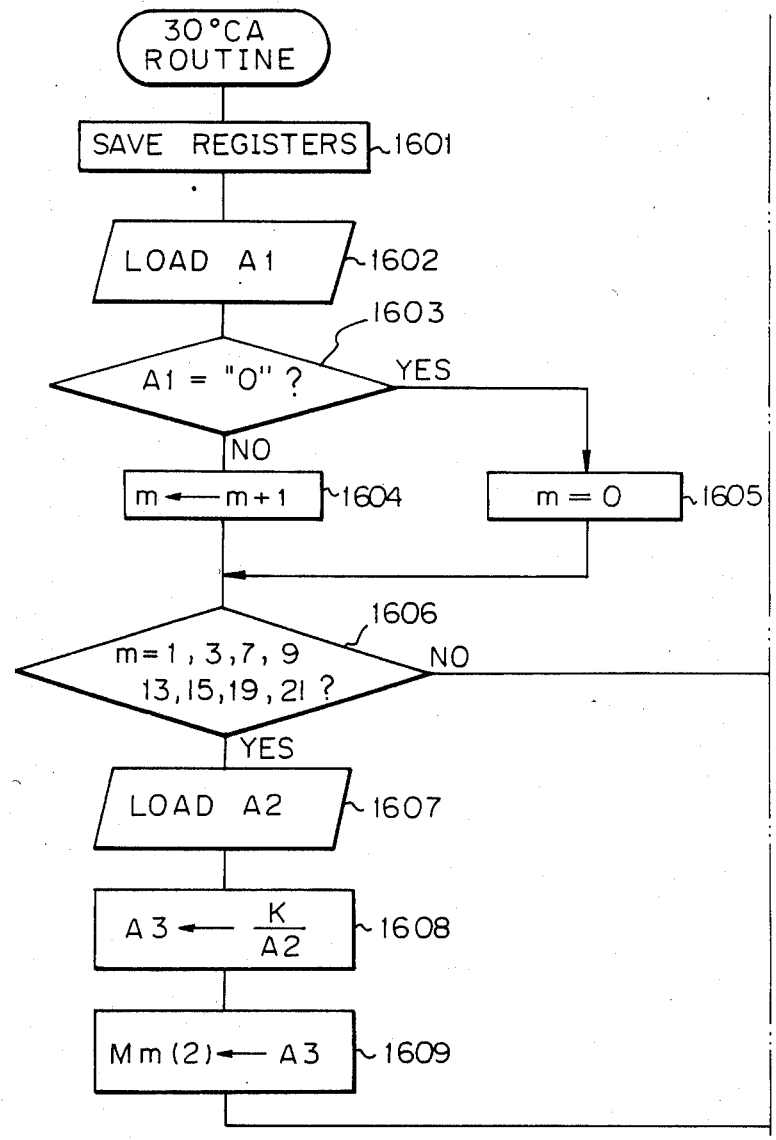
FIGS. 16A and 16B form a flowchart showing the operation of the operation of the control circuit of FIG. 10.
Figure 16B:
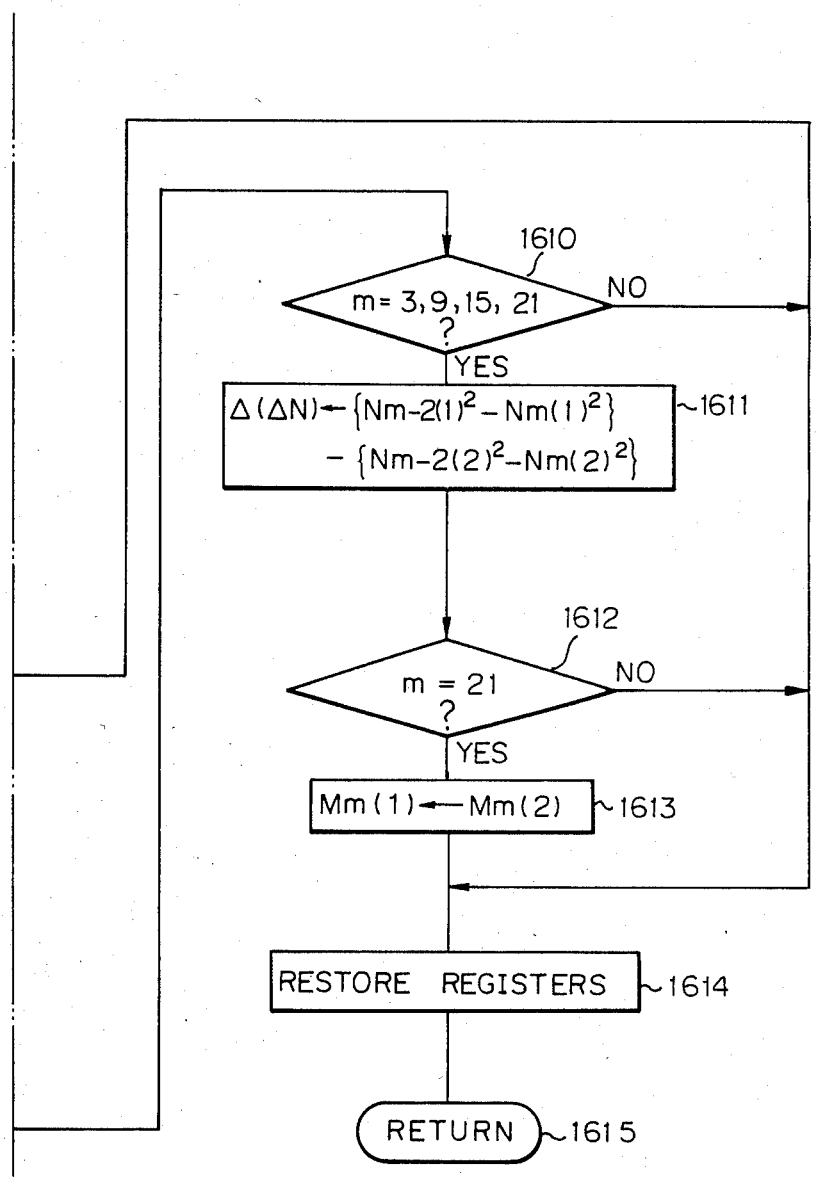

Reference numeral 89 represents a read-only memory (ROM) storing programs such as a main routine, an interrupt routine as illustrated in FIG. 16, and the like, and 90 a random-access memory (RAM) storing temporary data.

The CPU 88 activates the injectors 9 via an input-/output interface 91.

Figure 12B:
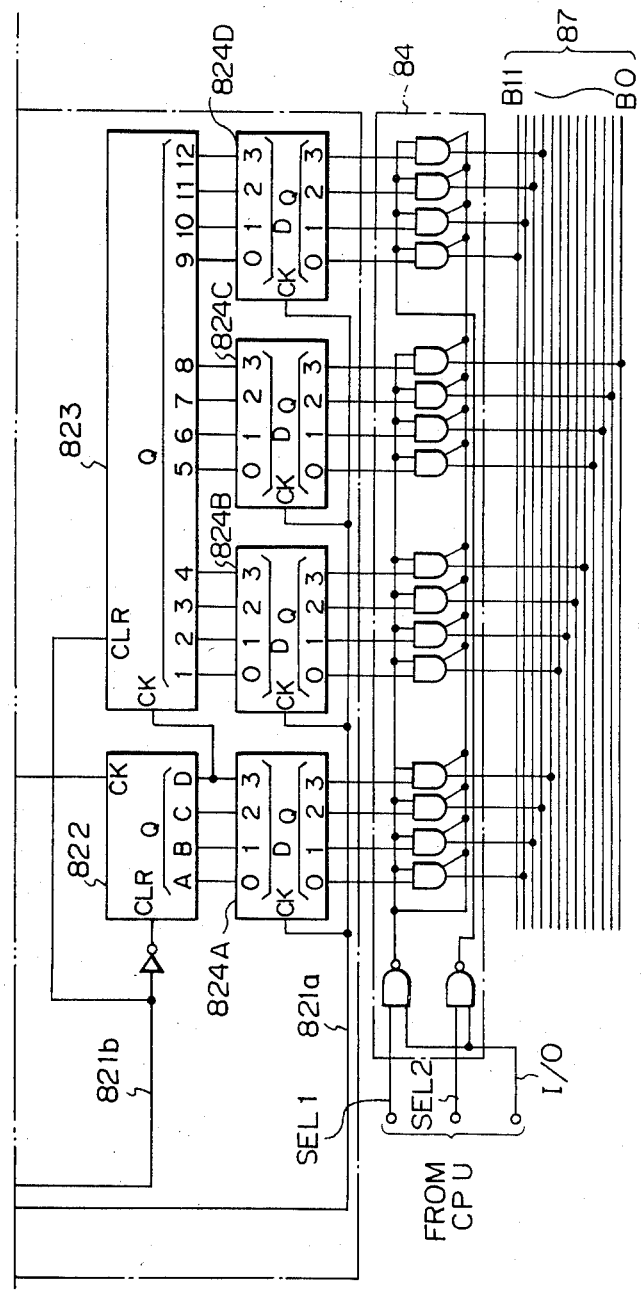

The counter circuit 82 and its peripheral circuits of FIG. 11 will be explained in detail with reference to FIG. 12. The clock generator 83 is comprised of an oscillating circuit 831 incorporating a crystal oscillator and a frequency divider 832 for dividing the output signal of the oscillating circuit 831. That is, the frequency divider 832 receives the output of the oscillating circuit 831 at its terminal CK and generates the divided output at its output terminal Q.

The counter circuit 82 is comprised of a counter 821, a 4-bit binary counter 822, a 12-bit binary counter 823, and 4-bit latch circuits 824A, 824B, 824C, 824D.

The counter 821 counts up the clock pulses at its terminal CL from the frequency divider 832, when the "0" level signal is supplied from the wave-shaping circuit 81 to the terminal R of the counter 821. The counter 821 generates outputs at its terminals Q1, Q3, and Q4, and stops the counting operation, when the output terminal Q4 reaches the "1" level. In this case, the output terminal Q4 of the counter 821 is connected to its counting end terminal CE.

In the binary counters 822 and 823, reference CK designates an input terminal, CLR a clear terminal, and QA to QD, and Q1 to Q12 output terminals.

The latch circuits 824A through 824D store the data supplied to the data terminals D0 to D3 thereof at a timing supplied to their terminals CK, and generate the stored data at their output terminals Q0 through Q3.

The operation of the counter circuit 82 of FIG. 12 will be explained with reference to FIGS. 13A through 13E.

A 30° CA signal 81a as shown in FIG. 13A is supplied from the wave-shaping circuit 81 to the terminal R of counter 821. When the signal 81a is at the "0" level, the counter 821 counts up the pulses from the frequency divider 832, and accordingly, the counter 821 generates pulse signals 821a and 821b as shown in FIGS. 13B and 13C, respectively. Then, when the output terminal Q4 of the counter 821 is changed from the "0" level to the "1" level, the counter 821 stops its counting operation so that the output terminal Q4 remains at the "1" level. Thus, the output 825a of an inverter 825 remains at the "1" level as shown in FIG. 13D. When the output 825a of the inverter 825 is at the "1" level, the pulse signals of the oscillating circuit 831 are supplied via a NAND circuit 826. That is, the outputs 826a of the NAND circuit 826 as shown in FIG. 13E are supplied to the terminal CK of the binary counter 822.

Thus, the binary counters 822 and 823 in combination count the time period T as shown in FIG. 13E. The binary counters 822 and 823 are reset by the pulse signal 821b as shown in FIG. 13C, and the data T stored in the counters 822 and 823 is transmitted to the latch circuits 824A, 824B, 824C, and 824D by the pulse signal 821a as shown in FIG. 13B.

The data T of the latch circuits 824A, 824B, 824C, and 824D is fetched by the CPU 88. That is, first, the CPU 88 generates read pulse signals I/O and SEL 1 so that the 12-bit data of the latch circuits 824A, 824B, and 824C is transmitted via the gates of the gate circuit 84 to the bits $B_0$ through $B_{11}$ of the bus 87. Second, the CPU 88 generates a read pulse signal SEL 2 instead of the read pulse signal SEL 1, so that the 4-bit data of the latch circuit 824D is transmitted via the gates of the gate circuit 84 to the bits $B_8$ through $B_{11}$ of the bus 87.

Figure 14:
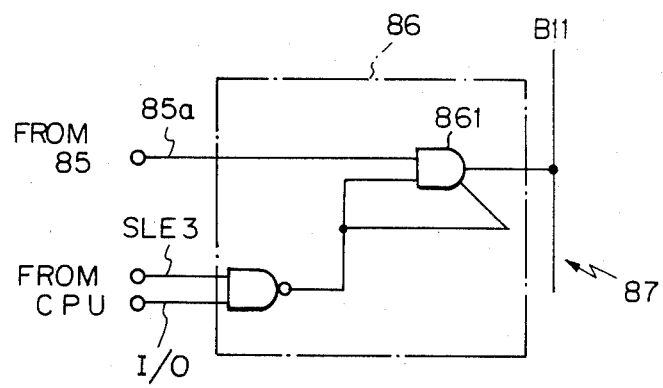
FIG. 14 is a circuit diagram of the read-in circuit of FIG. 11.

The read-in circuit 86 will be explained with reference to FIG. 14. The read-in circuit 86 comprises a 3-state buffer 861. The TDC signal S', i.e., the wave-shaped signal 85a, is fetched by the CPU 88. That is, the CPU 88 generates a read pulse signal SEL 3 as well as the signal I/O, and the signal 85a is transmitted via the buffer 861 to the bit $B_{11}$ of the bus 87.

The calculation of combustion variations will be explained with reference to FIGS. 15A, 15B, 15C, and 16.

Figures 15A, 15B, 15C:
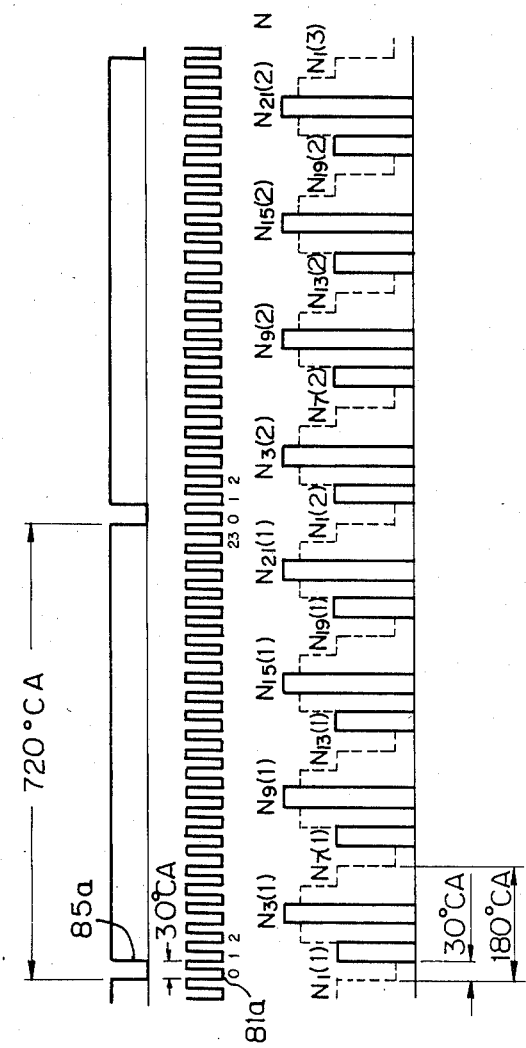
FIGS. 15A, 15B, and 15C are timing diagrams showing the operation of the control circuit of FIG. 10.

FIG. 15A is a waveform diagram of the TDC signal S', i.e., the signal 85a. The signal 85a is kept at "0" during an interval in which the crankshaft is rotated by 30° CA after the first cylinder reaches its top dead center.

FIG. 15B is a waveform diagram of the 30° CA signal S, i.e., the signal 81a. Each pulse number of the signal 81a corresponds to a 30° CA rotation from the time at which the first cylinder reaches top dead center. Thus, the first cylinder corresponds to pulse numbers 0 to 5, the third cylinder corresponds to pulse numbers 6 to 11, the fourth cylinder corresponds to pulse numbers 12 to 17, and the second cylinder corresponds to pulse numbers 18 to 23.

FIG. 15C is a waveform diagram of a mean engine rotational speed for each 30° CA period.

The routine of FIG. 16 is started by every trailing edge of the 30° CA signal S (81a). At step 1601, the CPU 88 saves the contents of the registers into the RAM 90. Then, at step 1602, the CPU 88 fetches the TDC signal S'. That is, the CPU 88 generates the read pulse signal I/O and SEL 3, so that the data appearing at the bit $B_{11}$ of the bus 87 is stored into the register A1. Note, A1 designates the value of the register A1 itself. At step 1603, the CPU 88 determines whether or not A1 is "0". If A1="0", i.e., if the firing stroke for the first cylinder is initiated, a counter memory m is cleared at step 1605. If A1="1", the counter memory m is counted up by +1 at step 1604. At step 1606, the CPU 88 determines whether or not the content of the counter memory m is any one of 1, 3, 7, 9, 13, 15, 19, and 21. If the content of the counter memory m is 1, 3, 7, 9, 13, 15, 19, or 21, the control advances to step 607. If not, the control flow jumps to step 1614.

At step 1607, the CPU 88 fetches a rotation time period data T from the counter circuit 82 by generating the read pulse signals I/O, SEL 1 and SEL 2 and stores it in a register A2. Then, at step 1608, the CPU 88 calculates the inverse number of the content of the register A2 and multiplies it by a suitable proportional coefficient K, thereby attaining a mean engine rotational speed N. The mean engine rotational speed N is stored in a register A3. At step 1609, the content of the register A3 is stored in a memory $M_m(2)$. In this case, eight memories $M_m(2)$ (m=1, 3, 7, 9, 13, 15, 19, 21) are provided. For example, a mean engine rotational speed from 30° CA to 60° CA of the crankshaft for the firing stroke of the first cylinder is stored in the memory $M_1(2)$, and a mean engine rotational speed from 90° CA to 120° CA of the crankshaft for the firing stroke of the third cylinder is stored in the memory $M_3(2)$. Similarly, a mean engine rotational speed from 210° CA to 240° CA of the crankshaft for the firing stroke of the fourth cylinder is stored in the memory $M_{19}(2)$, and a mean engine rotational speed from 270° CA to 300° CA of the crankshaft for the firing stroke of the second cylinder is stored in the memory $M_{21}(2)$.

At step 1610, the CPU 88 determines whether the counter memory m equals 3, 9, 15, or 21. If m=3, 9, 15, or 21, the control advances to step 1611. If not, the control jumps to step 1614. At step 1611, the CPU 88 calculates $$\Delta(\Delta N) \leftarrow \{N_{m-2}(1)^2 - N_m(1)^2\} - \{N_{m-2}(2)^2 - N_m(2)^2\}$$

where $N_{m-2}(1)$ and $N_m(1)$ are the values of $N_{m-2}(2)$ and $N_m(2)$, respectively, for the previous cycle.

Here, m is 3 for the first cylinder, 9 for the third cylinder, 15 for the fourth cylinder, and 21 for the second cylinder.

In the above-mentioned calculation equation, the values $\{N_{m-2}(1)^2 - N_m(1)^2\}$ and $\{N_{m-2}(2)^2 - N_m(2)^2\}$ correspond to the firing stroke of a predetermined cylinder as shown in FIGS. 3, 4, and 5, and the value $\Delta(\Delta N)$ is not affected by the road state, as explained with reference to FIGS. 9A and 9B.

At step 1612, the CPU 88 determines whether or not the counter memory m equals 21. If m=21, the control advances to step 1613, which transmits the content of the memories $M_m(2)$ to the memories $M_m(1)$ (m=1, 3, 7, 9, 13, 15, 19, and 21).

At step 1614, the CPU 88 restores the registers to the state before the interruption routine was initiated. The routine of FIG. 16 is completed by return step 1615.

In FIG. 16, the calculation at step 1611 can be replaced by $$\Delta N \leftarrow N_{m-2}(2)^2 - N_m(2)^2.$$

Further, a standard deviation $\sigma(\Delta N)$ for every 100 engine speed variations $\Delta N_i (i=0 \text{ to } 99)$ can be calculated by $$\sigma(\Delta N) = \sqrt{\frac{1}{100} \sum_{i=0}^{99} (\Delta N_i - \overline{\Delta N})^2}$$

where $$\overline{\Delta N} = \frac{1}{100} \sum_{i=0}^{99} \Delta N_i.$$

Note that, such a standard deviation $\sigma(\Delta N)$ can be calculated sufficiently by using more than 50 kinds of engine speed variations.

As explained above, according to the present invention, since the combustion (output) variations represented by $\Delta N$ ($=N_m^2 - N_n$), $\Delta(\delta N)(=\Delta N_2 - \Delta N_1)$, or $\sigma(\Delta N)$ on the basis of a periodical and pulse-like engine speed for every firing stroke are not subjected to the load of the engine due to the rough state of a road, and to the transient state such as acceleration or deceleration, the combustion variations are accurate.

Such accurately detected combustion variations will be very helpful in the feedback control of the air-fuel ratio or the ignition.

What is claimed is:

1. A method for detecting combustion variations in an internal combustion engine, comprising the steps of:
    detecting at least two engine rotational speeds at predetermined timings for every firing stroke in one cylinder of said engine;
    calculating the square of each of the detected engine rotational speeds;
    calculating an engine speed variation between two of the squared engine rotational speeds for every firing stroke in one cylinder of said engine; and
    performing a process upon the sequence of the calculated engine speed variations, thereby determining an engine combustion state by the processed result.

2. A method as set forth in claim 1, wherein said process performing step comprises a step of calculating a variation between the engine speed variation for the firing stroke of the previous cycle and the engine speed variation for the firing stroke of the current cycle.

3. A method as set forth in claim 1, wherein said process performing step comprises a step of calculating a standard deviation of a predetermined kinds of engine speed variations.

4. A method as set forth in claim 3, further comprising a step of controlling the feedback of the air-fuel ratio of said engine so that said calculated standard deviation is brought close to a predetermined value.

5. An apparatus for detecting combustion variations in an internal combustion engine, comprising:
    means for detecting at least two engine rotational speeds at predetermined timings for every firing stroke in one cylinder of said engine;
    means for calculating the square of each of the detected engine rotational speeds;
    means for calculating an engine speed variation between two of the squared engine rotational speeds for every firing stroke in one cylinder of said engine; and
    means for performing a process upon the sequence of the calculated engine speed variations, thereby determining an engine combustion state by the processed result.

6. An apparatus as set forth in claim 5, wherein said process performing means comprises means for calculating a variation between the engine speed variation for the firing stroke of the previous cycle and the engine speed variation for the firing stroke of the current cycle.

7. An apparatus as set forth in claim 5, wherein said process performing means comprises means for calculating a standard deviation of a predetermined kinds of engine speed variations.

8. An apparatus as set forth in claim 7, further comprising a means for controlling the feedback of the air-fuel ratio of said engine so that said calculated standard deviation is brought close to a predetermined value.

* * * * *